March 6, 1956 C. F. WOLTERS ET AL 2,737,431
ENDLESS CONVEYOR FILE
Filed Nov. 1, 1952 11 Sheets-Sheet 4

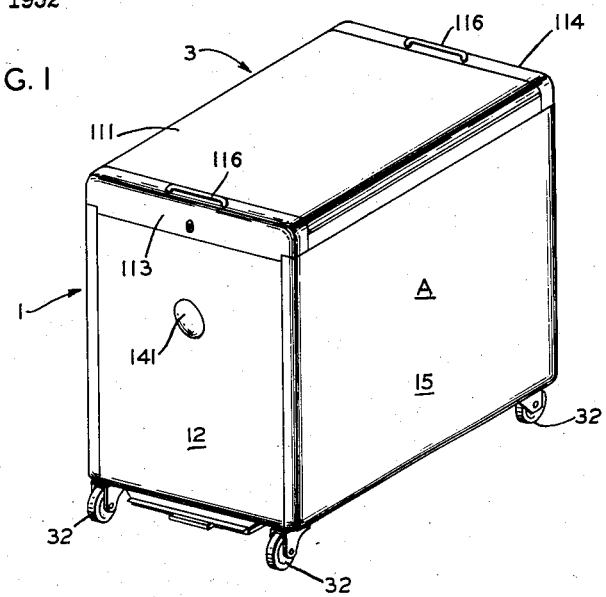
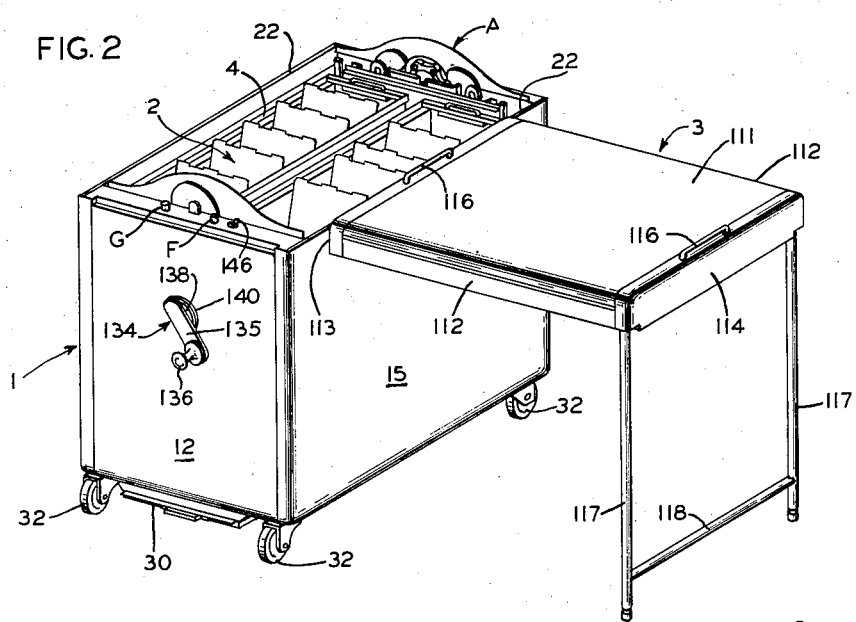

INVENTORS
CARL F. WOLTERS &
NEILS Y. ANDERSEN DECEASED
by BIRTE ANDERSEN, EXECUTRIX
BY
ATTORNEYS

March 6, 1956  C. F. WOLTERS ET AL  2,737,431
ENDLESS CONVEYOR FILE
Filed Nov. 1, 1952  11 Sheets-Sheet 5

March 6, 1956

C. F. WOLTERS ET AL 2,737,431

ENDLESS CONVEYOR FILE

Filed Nov. 1, 1952

INVENTORS
CARL F. WOLTERS &
NEILS Y. ANDERSEN, DECEASED,
BY BIRTE ANDERSEN, EXECUTRIX
BY
George V. Eltgroth
Thomas S. Ross
ATTORNEYS March 6, 1956 C. F. WOLTERS ET AL 2,737,431
ENDLESS CONVEYOR FILE
Filed Nov. 1, 1952 11 Sheets-Sheet 8
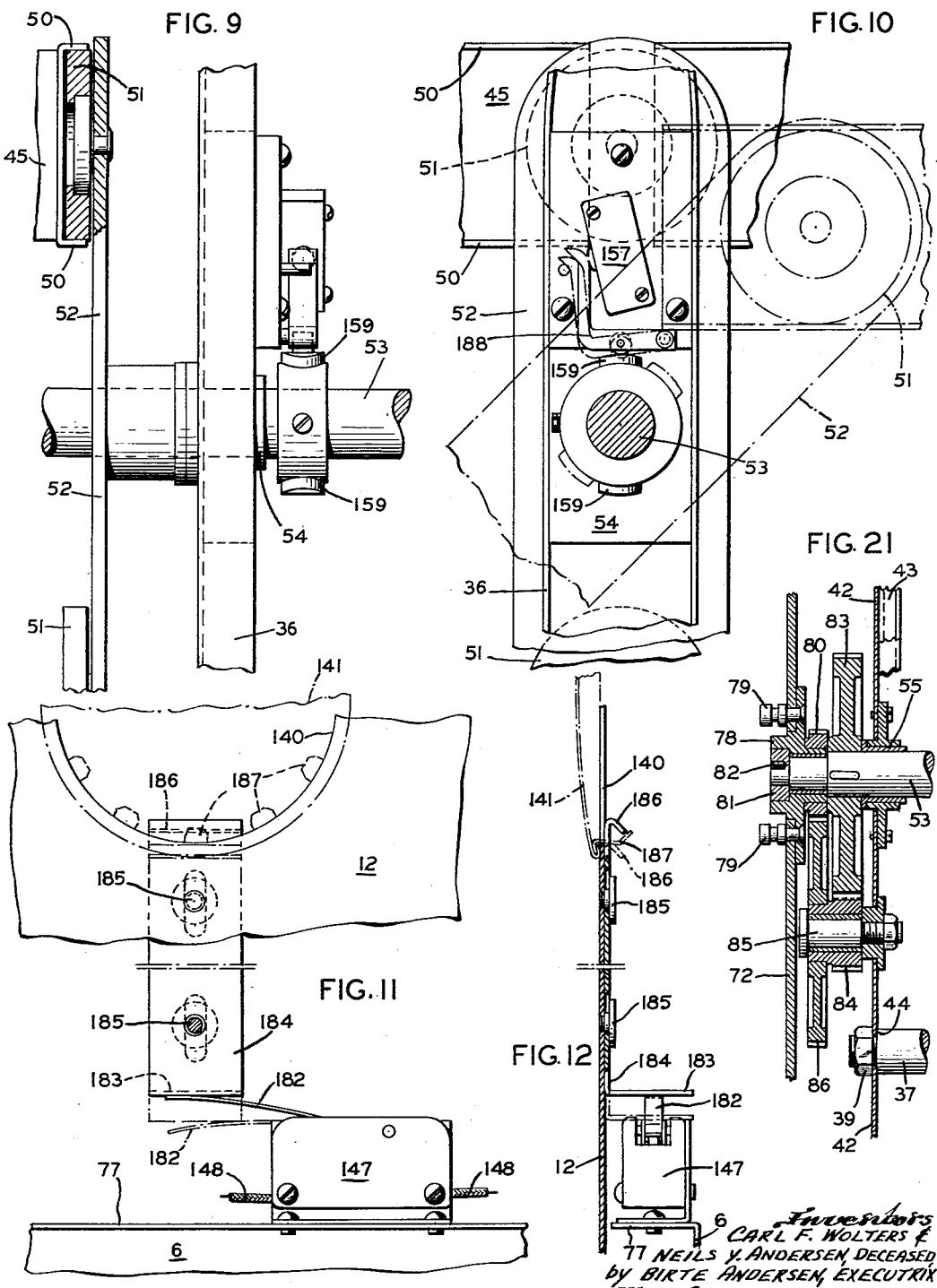
Inventors
CARL F. WOLTERS &
NEILS V. ANDERSEN DECEASED
by BIRTE ANDERSEN, EXECUTRIX
BY George V. Elgoth
Thomas S. Ross
ATTORNEYS March 6, 1956
C. F. WOLTERS ET AL
2,737,431
ENDLESS CONVEYOR FILE
Filed Nov. 1, 1952
11 Sheets-Sheet 9
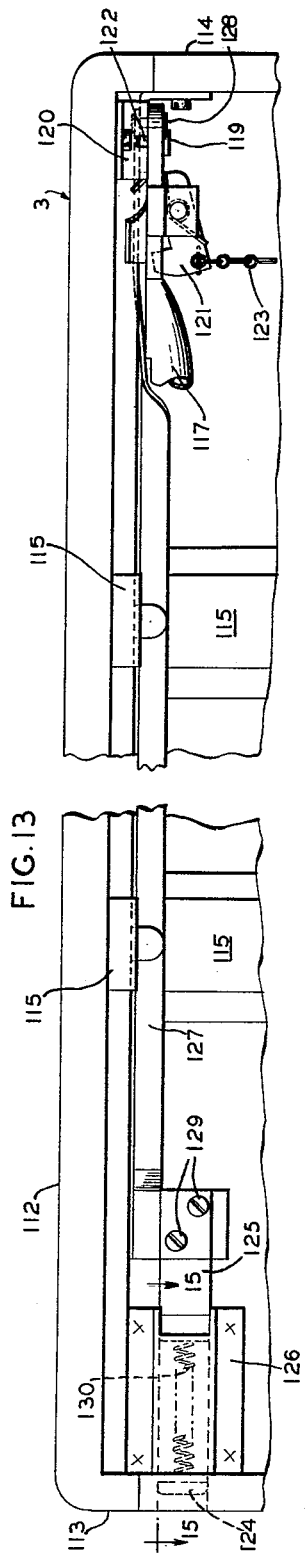
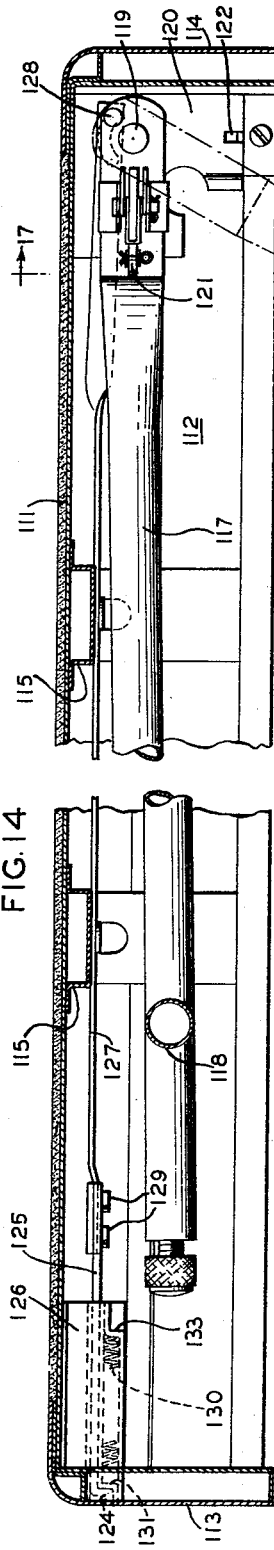
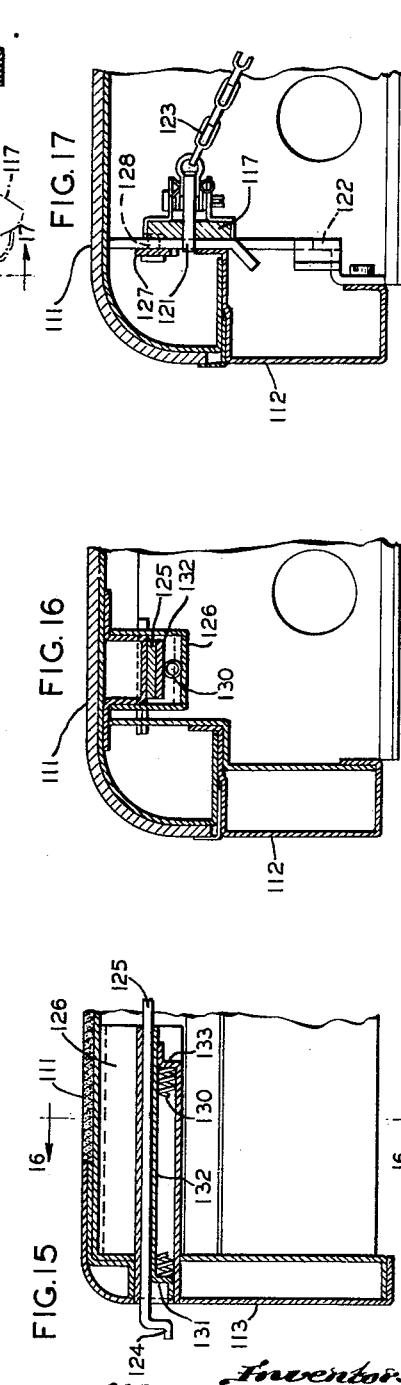
Inventors
CARL F. WOLTERS &
NEILS V. ANDERSEN, DECEASED,
by BIRTE ANDERSEN, EXECUTRIX
BY
George V. Eltgroth
Thomas S. Ross
ATTORNEYS March 6, 1956  C. F. WOLTERS ET AL  2,737,431

ENDLESS CONVEYOR FILE

Filed Nov. 1, 1952  11 Sheets-Sheet 10

Inventors
CARL F. WOLTERS &
NEILS Y. ANDERSEN, DECEASED,
by BIRTE ANDERSEN, EXECUTRIX

BY

ATTORNEYS

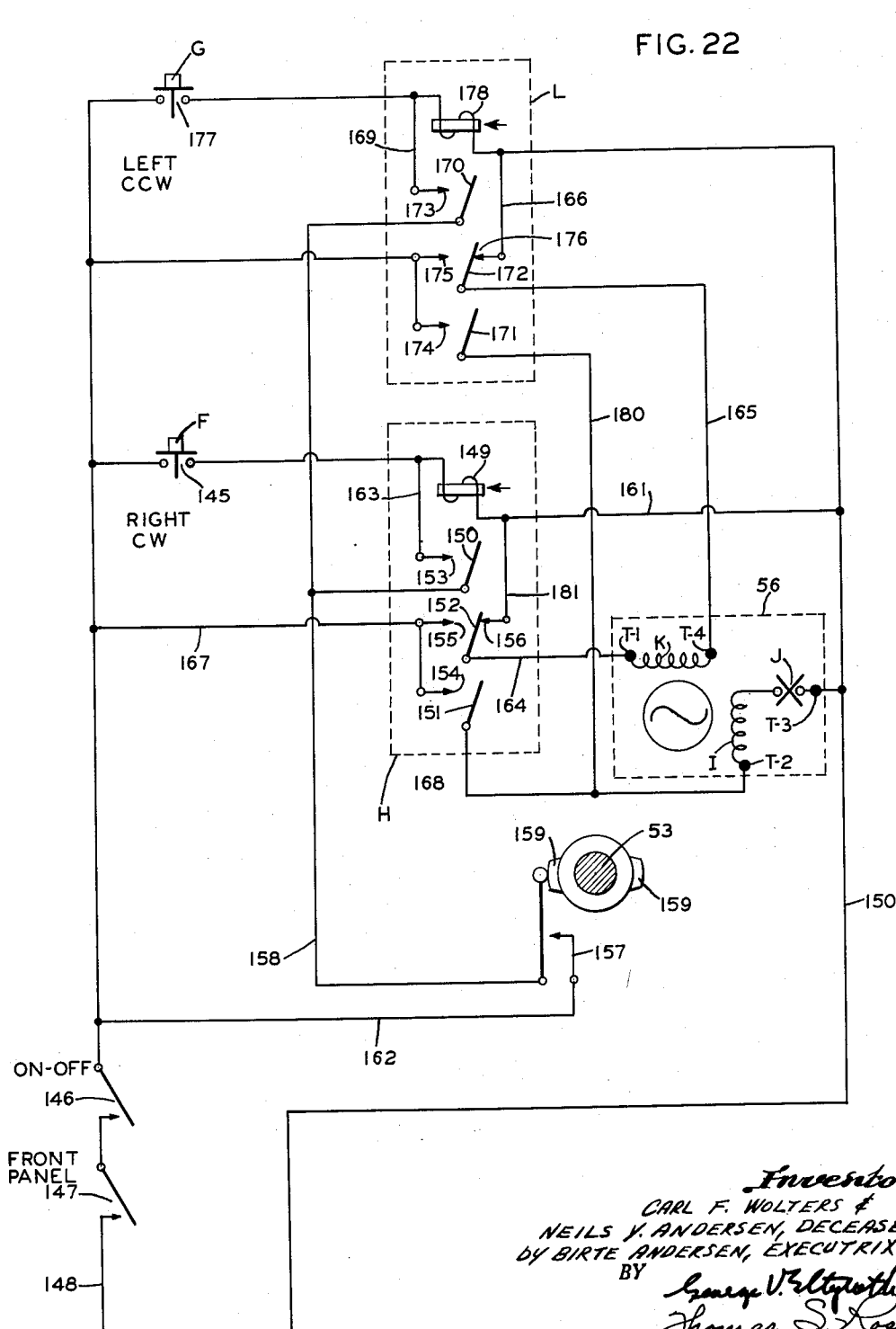

United States Patent Office

2,737,431
Patented Mar. 6, 1956

2,737,431

ENDLESS CONVEYOR FILE

Carl F. Wolters, New Canaan, Conn., and Neils Y. Andersen, deceased, late of Snyder, N. Y., by Birte Yde Andersen, executrix, Snyder, N. Y., assignors, by mesne assignments, to Sperry Rand Corporation, New York, N. Y., a corporation of Delaware Application November 1, 1952, Serial No. 318,278

13 Claims. (Cl. 312—223)

This invention relates generally to card filing equipment and more particularly to an endless conveyor file having a plurality of card trays mounted to travel in an endless vertical path within the file casing.

The invention provides an endless conveyor file construction that facilitates economical manufacture; provides larger record capacity in a given space and improved accessibility to the records.

The invention further provides an endless conveyor file in which the record trays may be quickly and conveniently removed from the file casing by merely lifting them off of the conveyor chain tray arms; in which access to the trays is at the open top of the file casing where two trays are always at reference position; in which the endless conveyor chains are retained and guided within improved and simplified chain guides; in which the chain actuating mechanism is of simple and rugged construction capable of being driven by power or by hand; wherein the chain actuating mechanism also serves to successively retain the card trays at reference position adjacent the open top of the file casing; in which improved stabilizers are provided to maintain horizontal positioning of the card trays throughout their entire travel within the casing; and in which the cover for the open top casing is removable to serve as a desk or table for an operator using the file.

Other objects of the invention will be pointed out in the following description and claims, and illustrated in the accompanying drawings which disclose, by way of example only, the principle of the invention and the best modes which have been contemplated, of applying that principle.

In the drawings:

Fig. 1 is an isometric view of an endless conveyor file made in accordance with the present invention and illustrated with the casing cover in closed position.

Fig. 2 is an isometric view similar to Fig. 1 but showing the casing cover removed and supported to serve as a desk or table.

Figs. 9 and 10 are fragmentary detail views partly in vertical section showing the motor cut-off switch that is controlled by the main drive shaft.

Figs. 11 and 12 are fragmentary detail views illustrating a second motor cut-off switch which is automatically actuated when changing from motor to hand-drive.

Fig. 13 is a fragmentary bottom plan view of the casing cover showing one of the foldable legs in closed position within the cover.

Fig. 14 is a vertical longitudinal section through the casing cover taken substantially along the plane indicated by line 14—14 in Fig. 3.

Fig. 15 is a fragmentary vertical sectional detail taken on a plane corresponding to the line 15—15 of Fig. 13.

Fig. 16 is a fragmentary vertical section along the line 16—16 of Fig. 15.

Fig. 17 is a fragmentary vertical section along the line 17—17 of Fig. 14.

Fig. 21 is a vertical section through the reduction gearing which forms part of the drive between the motor and main drive shaft, and Fig. 22 is a wiring diagram of the circuit which controls the motor that drives the main shaft.

Figure 3:
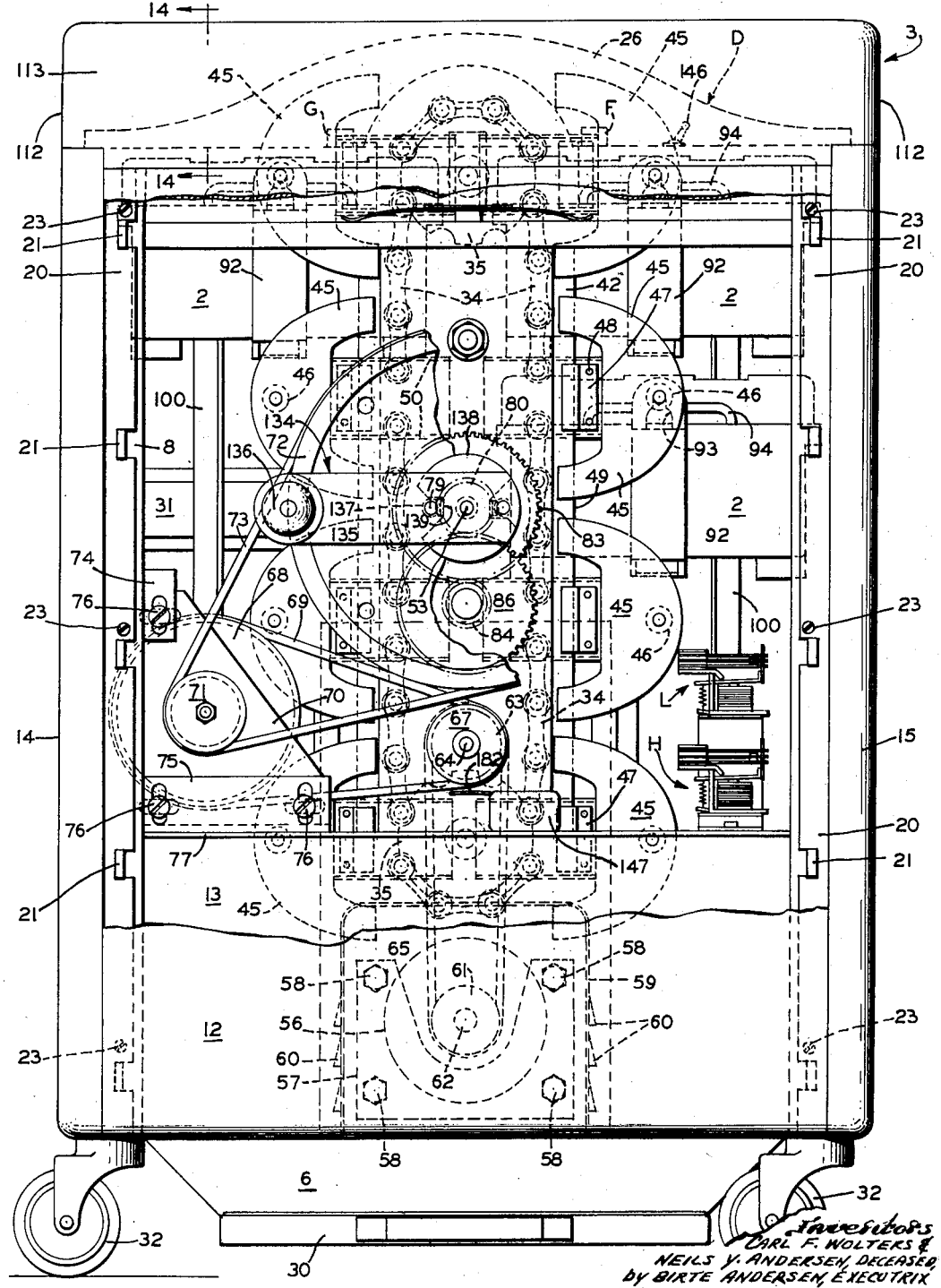
Fig. 3 is a front end elevational view of Fig. 1 on an enlarged scale with the front end panel of the casing partially broken away to show portions of the motor drive and center frame housed within the casing.

In the embodiments of the invention illustrated in the drawings, an endless conveyor file designated, generally, by reference character A in Figs. 1 and 2 comprises a casing 1 within which a plurality of card trays 2 are mounted to travel in an endless vertical path to successively position selected pairs of such trays adjacent the open top of the casing.

As shown in Fig. 1 reference numeral 3 indicates a removable cover which serves to close the open top of casing 1 when file A is not in use. When cover 3 is removed from casing 1, as shown in Fig. 2, it may also serve as a desk or table for an operator using the file as will be more fully described later in the specification.

*Casing*

Figure 8:
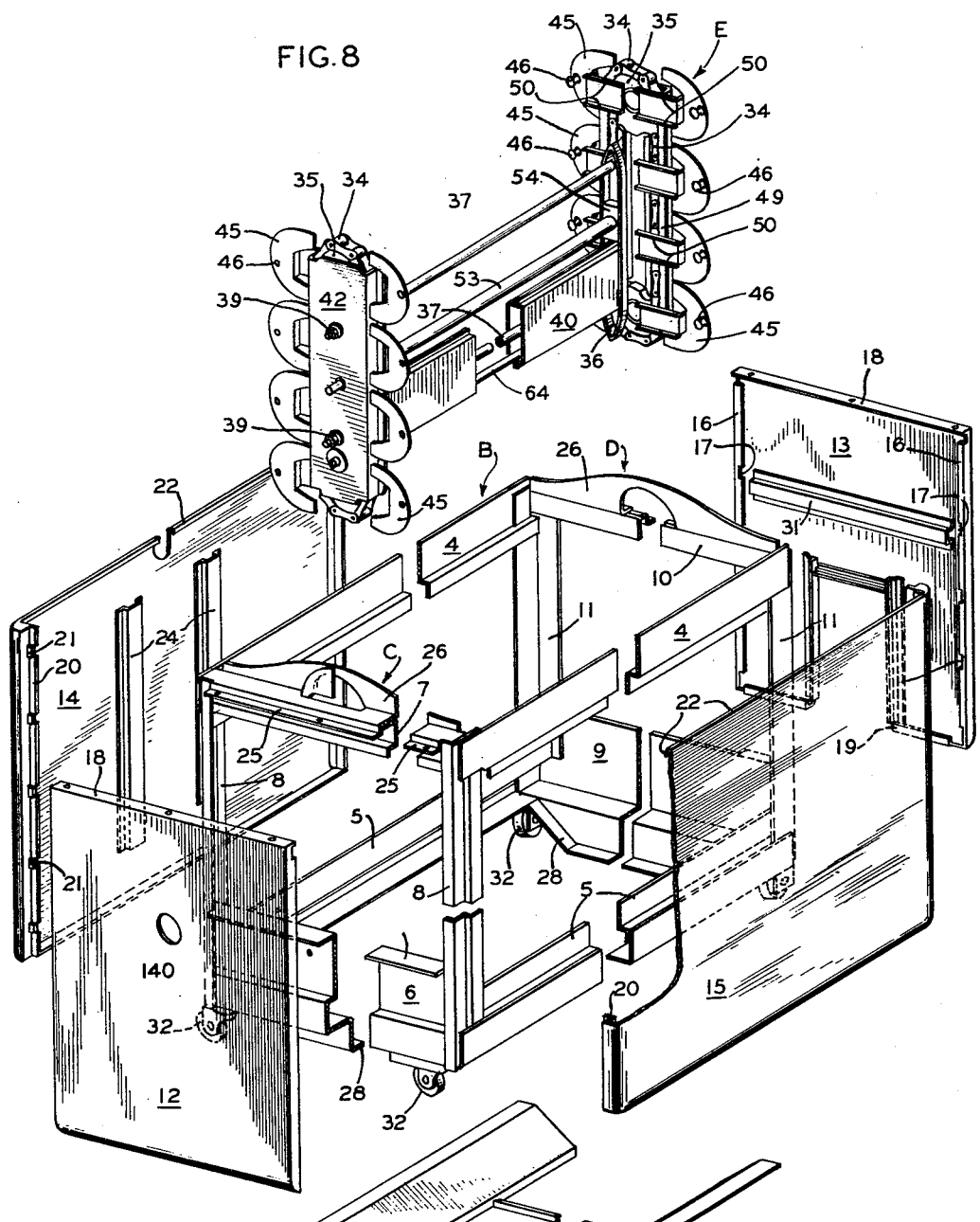
Fig. 8 is an exploded isometric view illustrating the construction of the file casing and center frame assembly.

Casing 1 for the endless conveyor file A is best illustrated in the exploded view Fig. 8 wherein reference character B designates the main supporting frame as a whole. This main supporting frame B includes a substantially rectangular front frame C which is spaced from but joined to a similar rear frame D by top side members 4 and bottom side members 5 respectively. Front frame C comprises a horizontal bottom cross bar member 6 which is spaced from and joined to a horizontal top cross bar member 7 by uprights or corner posts 8—8. Similarly, rear frame D comprises a horizontal bottom cross bar member 9 which is spaced from and joined to a horizontal top cross bar member 10 by uprights or corner posts 11—11.

The open ends of main supporting frame B are suitably closed by removable sheet metal end panels 12 and 13, and the open sides of frame B are suitably closed by removable side panels 14 and 15 respectively. As shown in Fig. 8 the side edges of end panels 12 and 13 respectively are formed with a return bend section forming an attaching strip 16 having spaced notches 17 therein for reasons presently disclosed, and the top and bottom edges of said end panels are formed with flanges 18 and 19 respectively. The front and rear edges of side panels 14 and 15 are formed with a curved corner section which merges into an offset attaching flange 20, the latter being provided with spaced attaching lugs 21 formed by reverse bends as clearly illustrated in Figs. 5 and 8. The top edge of each side panel 14—15 is formed with a return bend section 22 forming a channel to receive the upper edge of top side members 4 when mounting said panels upon the main supporting frame B.

Figure 5:
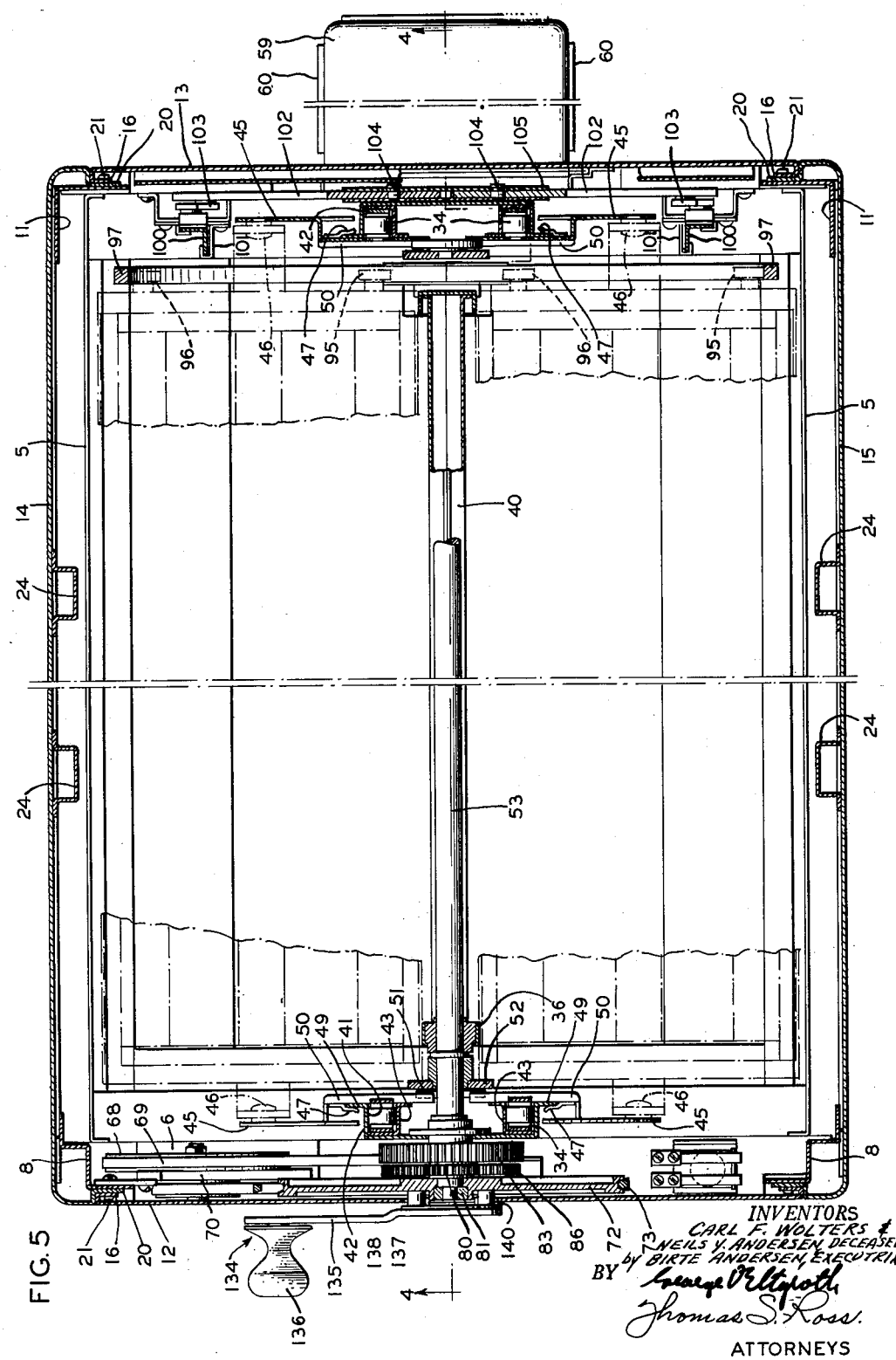
Fig. 5 is a transverse horizontal section on offset planes taken substantially along the line 5—5 of Fig. 4.

It will now be understood that side panels 14 and 15 are secured to main supporting frame B by placing their channel sections 22 over the top edge of top side members 4 and then securing the attaching flanges 20 to the corner posts 8 and 11 respectively, by screws 23 as will be clear from Fig. 3. The side panels 14 and 15 may be considerably strengthened by spot-welding a pair of vertically disposed reinforcing channels 24 to the inner surface as shown in Figs. 3, 5 and 8. When the side panels 14 and 15 are secured to the main supporting frame B, as above described, end panels 12 and 13 may then be secured to frame B. This is accomplished by registering the notches 17 with the lugs 21 and then sliding the panel downwardly to engage the lugs behind the attaching flanges 20 until the top flange 18, of said end panel, rests upon the horizontal flange 25 formed with the front chain track supporting bar 26. There are two chain tracks supporting bars 26 and these bars are rigidly secured, to the top cross members 7 and 10 respectively, as shown in Fig. 8, preferably by spot-welding or other suitable fastening means.

The bottom of casing 1 comprises of a pair of angularly disposed sheet metal plates 27 (Figs. 6 and 8) spot-welded along their upper longitudinal edge to bottom side members 5 and to inturned flange 28 formed with bottom cross members 6 and 9 of front and rear frames C and D respectively.

Figure 6:
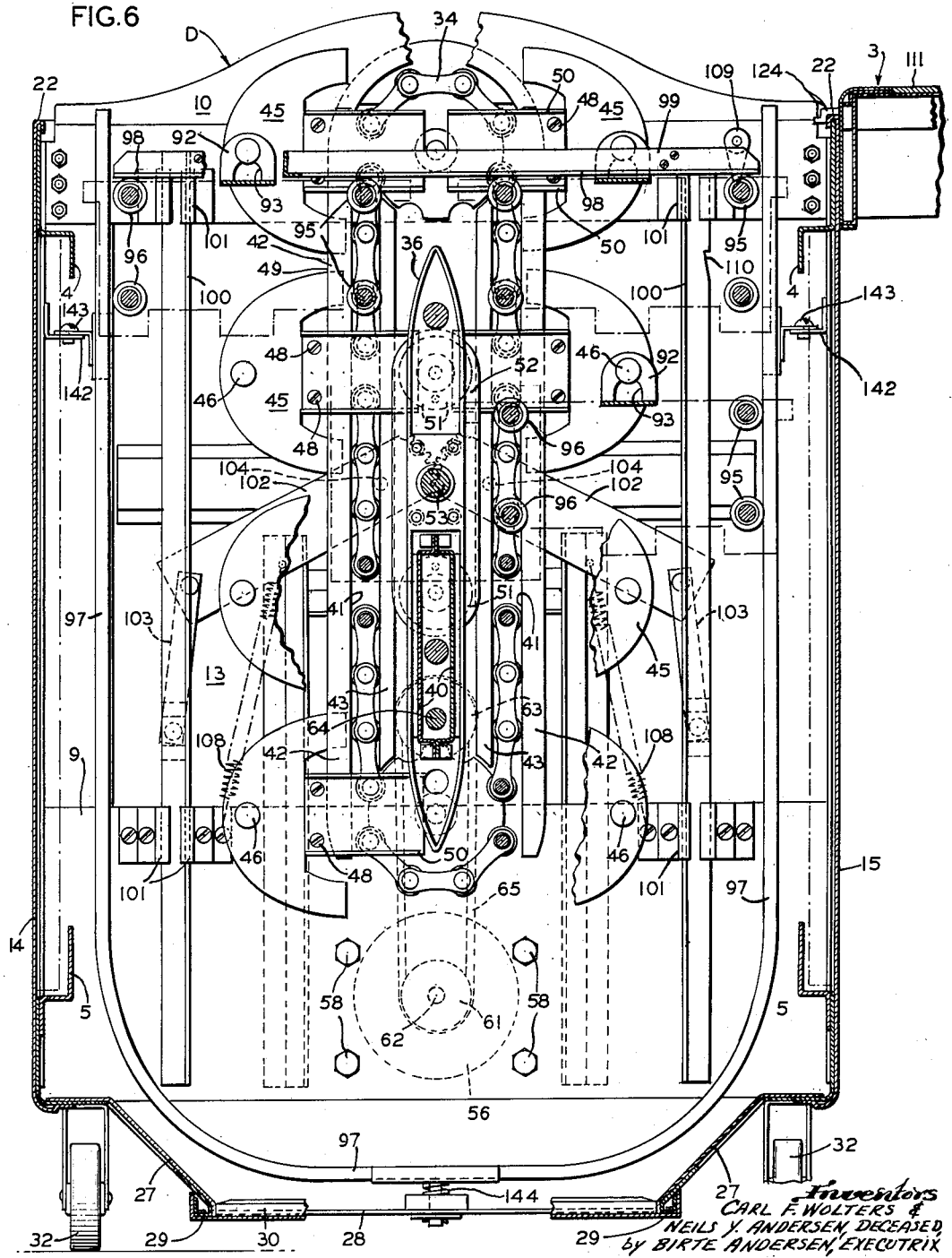
Fig. 6 is a transverse vertical section taken along the line 6—6 of Fig. 4.

The lower free marginal edges of each plate 27 is formed with an outwardly disposed flange 29 for slidably supporting a shallow tray or drawer 30 as best shown in Figs. 6 and 8. End panels 12 and 13 are strengthened in a manner similar to side panels 14—15 by a horizontally disposed reinforcing channel 31, such channel being spot-welded to the inner surface of its associated end panel as shown in Figs. 6 and 8.

In order to make the endless conveyor file A readily portable, main supporting frame B is provided at the front with casters and at the rear with wheels 32. Stems 33 of front casters 32 are preferably journalled within the spaced horizontal sections of bottom cross member 6, and the rear wheels 32 are rigidly fixed to the bottom cross member 9 as shown in Fig. 6.

*Center frame*

Figure 4:
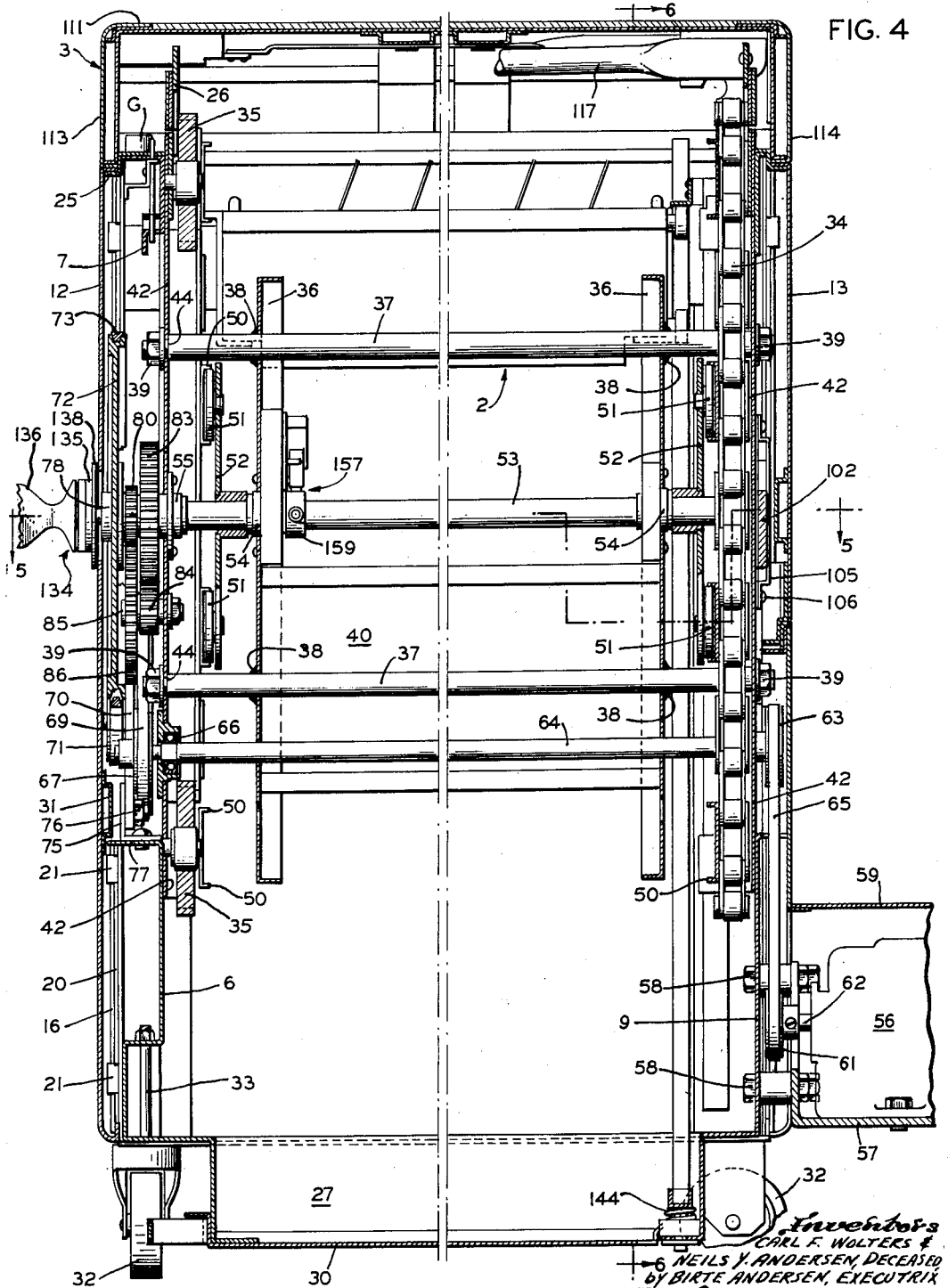
Fig. 4 is a central longitudinal vertical section through the endless conveyor file taken on a plane corresponding to the line 4—4 of Fig. 5.
Figure 7:
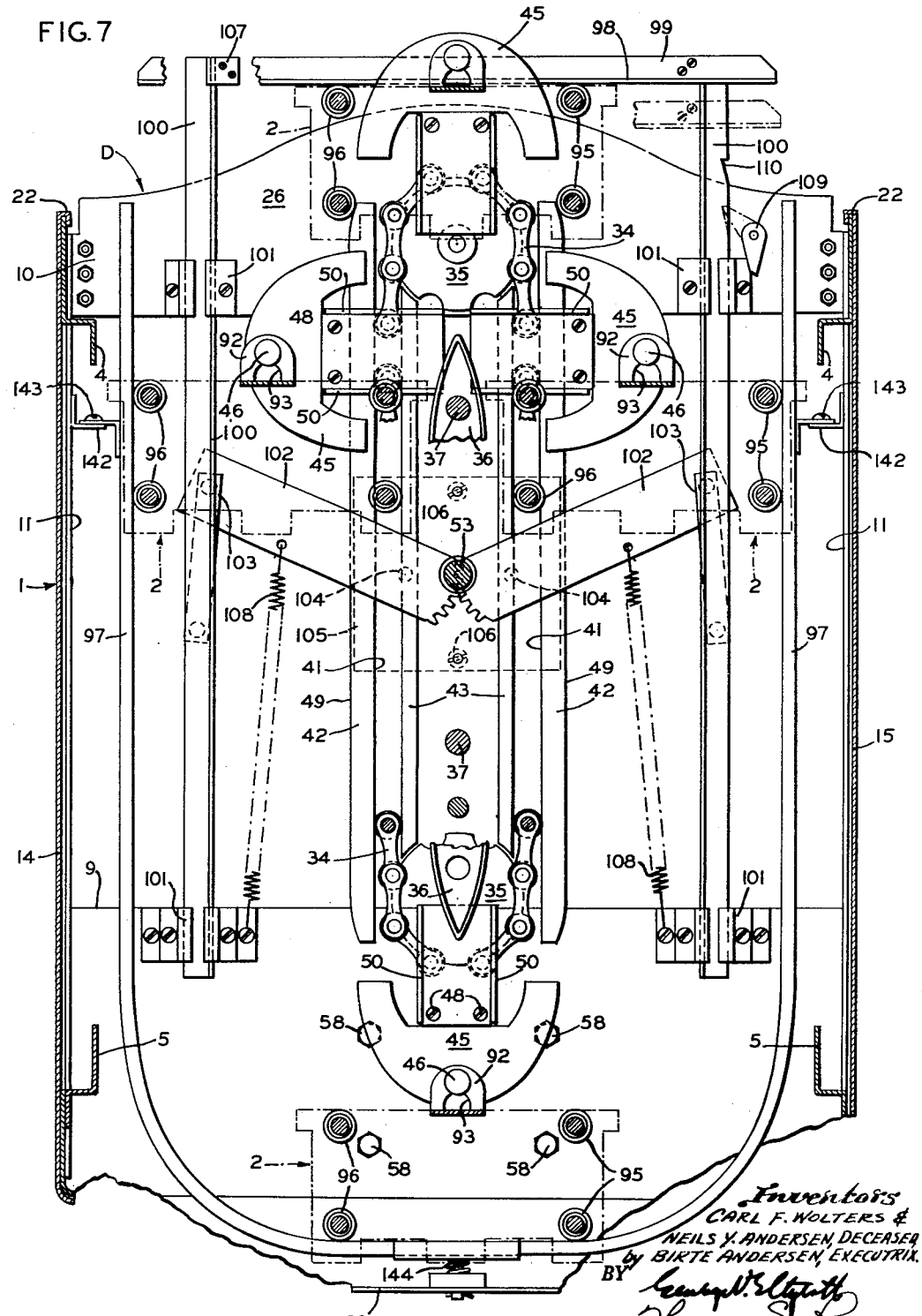
Fig. 7 is a transverse vertical section similar to Fig. 6 but with parts removed and the card trays in a different position to illustrate their cooperation with the top stabilizer.

As previously stated a plurality of card trays 2, arranged in two vertical parallel rows, are mounted to travel in an endless vertical path within file casing 1. These trays are pivotally carried by a pair of spaced parallel conveyor chains 34 trained over sprockets 35 as best illustrated in Figs. 4, 7 and 8. The chains 34 and sprockets 35 are supported by a center frame generally indicated by reference character E which will now be described in detail, attention being directed particularly to Figs. 3, 4, 5, 7 and 8 respectively. As shown in these figures, center frame E comprises a pair of flanged parallel frame members 36 forming inner vertical stabilizers for the trays 2 for reasons presently described. A pair of longitudinally extending tie rods 37 are preferably welded to frame members 36, as indicated at 38 (Fig. 4), and the ends of said tie rods project beyond said frame members and are reduced in diameter to form shoulders 44, the reduced portions being threaded to receive nuts 39. Stabilizer frame members 36 are further joined to one another in spaced parallel relation by a longitudinal box-like sheet metal support 40 shown best in Figs. 4 and 6. The vertical portions of each conveyor chain 34 are guided within a groove or raceway 41 formed between outer chain track 42 and an inner chain track 43. Each inner chain track is preferably welded to its associated outer chain track and the outer chain tracks are drawn against the shoulders 44, formed on tie rods 37, by nuts 39 to rigidly unite center frame E with the outer chain tracks as will be clear from Fig. 4. Center frame E is mounted and suitably secured within main supporting frame B by bolting the outer chain tracks 42 to top cross members 7 and 10 and to bottom cross members 6 and 9 of front and rear frames C and D respectively.

*Conveyor chains*

Each conveyor chain 34 has a plurality of offset tray arms 45 equally spaced from one another and each arm carries a headed stud 46 upon which the trays 2 are pivotally mounted. Each tray arm 45 is further provided with an offset plate 47 attached thereto by screws 48. Flange 49 of outer chain track 42 is received between said plate and arm to guide the arms in their vertical travel within casing 1. Each tray arm 45 is also provided with spaced parallel strip portions 50 for cooperation with rollers 51 carried by the crank arms 52, the latter being fast on the main drive shaft 53 which is rotatably journalled in bearings 54 carried by the flanged frame members 36. It will be understood from Fig. 4 that the crank arms 52 are mounted adjacent flanged frame members 36, and to the outside thereof, and that the front end of main drive shaft 53 is further journalled in a bearing 55 (Fig. 21) carried by front outer chain track 42. It will be further noted that rollers 51, rotatably carried by the crank arms 52, are spaced so as to enter between the strip portions 50 of adjacent tray arms 45 to advance the conveyor chains and in turn the tray arms 45 one position for each 180° rotation of main drive shaft 53.

*Main drive shaft*

It will be recalled that main drive shaft 53 is journalled in bearings 54 and 55, and that crank arms 52, carrying rollers 51, are fixed for rotation with said drive shaft. The motor drive for rotating main drive shaft 53 will now be explained with reference particularly to Figs. 3, 4, 5 and 21. As shown in Fig. 4 a split-phase induction type motor 56 is mounted at the rear of casing 1 upon a supporting bracket 57, the latter being fastened to bottom rear cross member 9 by bolts 58. Motor 56 is suitably housed within a removable cover 59 and the vertical side walls of the cover are supplied with louvers 60 permitting air to circulate through the cover to insure adequate cooling of the motor. Pulley 61, fast on motor shaft 62, drives a similar pulley 63 fast on the rear end of driven shaft 64 through an endless belt 65. Shaft 64 is journalled in bearings 66, which are mounted in the front and rear chain tracks 42, and a pulley 67 is secured to the end of shaft 64 that projects outwardly beyond the front chain track 42, as best illustrated in Figs. 3 and 4. Driving connection is made between small pulley 67, on shaft 64, and a larger pulley 68 through an endless belt 69. Pulley 68 is rotatably journalled upon the rear of supporting plate 70 and a smaller pulley 71, fixed for rotation with pulley 68, is positioned to the front of plate 70 as clearly shown in Fig. 3. Driving connection between the small pulley 71 and a still larger pulley 72, is through an endless belt 73. Plate 70 is adjustably mounted upon a pair of brackets 74 and 75 by bolts 76 to provide for slack take up or tension adjustment of belts 69 and 73 as needed. Bracket 74 is securely attached to the left corner post 8, as viewed in Fig. 3, and bracket 75 is rigidly secured to the top flange 77 of front bottom cross member 6.

Large pulley 72 is secured to a hub 78, by slotted studs 79 (Fig. 21), and a pinion 80 is fixed for rotation with the hub 78 and pulley 72. Hub 78 is rotatably journalled upon the reduced forward end of main drive shaft 53 and is held thereon by a collar 81 secured to said shaft by set screw 82. Keyed to main drive shaft 53 is a gear 83 which is located between pinion 80 and bearing 55. Pinion 84, meshing with gear 83, is rotatably journalled upon shoulder stud 85 which is mounted in, and projects forwardly from, the front outer chain track 42. Gear 86, meshing with pinion 80, is secured to pinion 84. The construction is such that rotary motion imparted to main drive shaft 53 from pulley 72 is through pinion 80, gear 86, pinion 84 and gear 83 respectively and this gear train causes main shaft 53 to be rotated at a much lower speed than that of pulley 72.

It will now be apparent that whenever motor 56 is energized main drive shaft 53 will be rotated as follows: Motor pulley 61 will drive pulley 63 through belt 65 at the rear of casing 1 and pulley 63 in turn rotates longitudinal shaft 64 and pulley 67 located at the front of said casing. Pulleys 68 and 71 will then be driven from pulley 67 through endless belt 69 and the rotation of pulley 71 will be imparted to large pulley 72 through the endless belt 73. As above pointed out, rotary motion is imparted to main drive shaft 53 from pulley 72 through gears and pinions 80, 86, 84 and 83 respectively.

Figure 18:
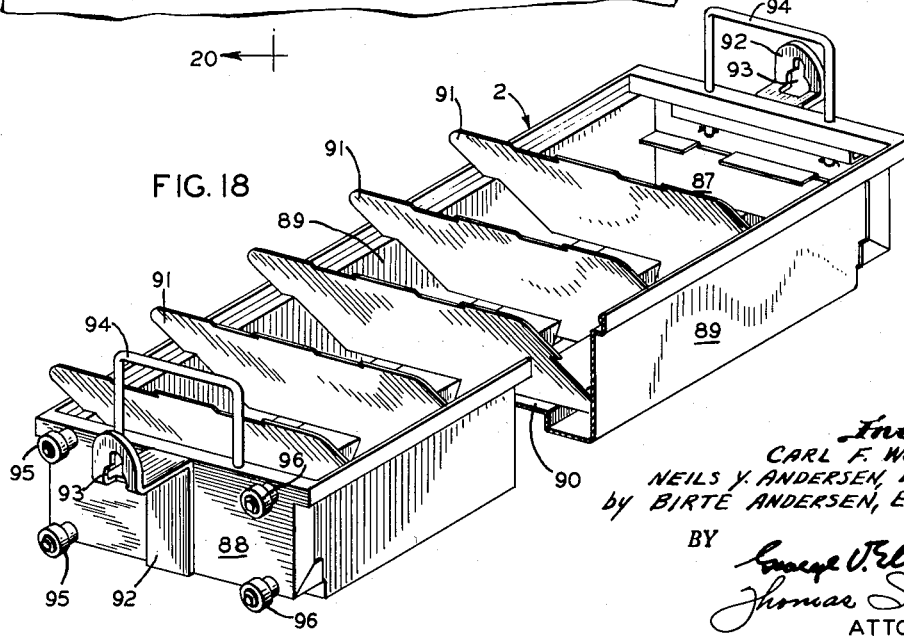
Fig. 18 is an isometric view of one of the card trays partly in vertical section with the tray handles shown in extended or tray carrying position.

There are eight card trays 2 in the conveyor file shown, and since all are identical in construction a detailed description of one will suffice for all. Referring to Fig. 18 each card tray 2 comprises front and rear walls 87 and 88 respectively, side walls 89 and a bottom 90. Conventional spaced card divider plates 91 may be pivotally connected to bottom 90 of each card tray 2 in any well known manner. Each card tray 2 is further provided with a pair of offset brackets or hanger arms 92 which are fastened midway the side walls 89 to the front and rear walls 87 and 88 respectively. Each hanger arm 92 has a slotted aperture 93 to pivotally receive an associated headed stud 46 carried by tray arm 45. To facilitate handling of the card trays, each tray is provided with a pair of U-shaped handles 94 which are slidably mounted in the front and rear walls 87—88 of said trays as clearly illustrated in Fig. 18. When not in use, handles 94 may be lowered to the position indicated in Figs. 3 and 4 or raised to the position illustrated in Fig. 18 when connecting the trays 2 to studs 46 or removing them therefrom.

It is desirable that the card trays 2 remain in horizontal position at all times regardless of their movement within casing 1. To this end two pairs of rollers 95—96 are rotatably mounted upon the rear wall 88 of each tray 2, and the rollers cooperate with stabilizing means in a manner now described.

When in normal position, the card trays 2 are disposed in two adjacent vertical rows, four trays in each row as best shown in Fig. 3, with the top tray of one row in horizontal alignment with the top tray of the other row and both trays at reference position adjacent the open top of casing 1, as will be clear from Fig. 2.

Assume now that main drive shaft 53 is rotated 180° in a counter-clockwise direction as viewed in Fig. 6. This will cause the card trays in the left hand vertical row to descend and the card trays in the right hand vertical row to ascend within casing 1. As the trays in the left hand vertical row descend their rollers 96 are engaged with the vertical left side portion of looped stabilizer rod 97 and their right side walls 89 slide along the flanged frame members 36, thereby maintaining a horizontal position of the trays as they descend within the casing. Looped stabilizer 97 is secured near its ends to rear corner posts 11, of main supporting frame B, by angular brackets 142 and screws 143 as shown in Fig. 7, and at its lower looped end by resilient mounting 144 supported by flange 28 of bottom rear cross member 9. Similarly, trays in the right hand vertical row are kept in horizontal alignment as they ascend within the casing by engagement of their rollers 95 with the right side vertical portion of stabilizer rod 97, and by their left side walls 89 sliding upwardly along the flanged frame members 36. As the bottom tray in the left vertical row is transferred to the right vertical row or vice versa, the bottom pair of rollers 95—96 follow the looped bottom portion of stabilizer rod 97. Similarly, when the top tray in the right hand vertical row is transferred to the left hand vertical row or vice versa, its top pair of rollers 95—96 come into rolling contact with horizontal flange 98 of top stabilizer bar 99. Top stabilizer bar 99 is suitably attached to a pair of brackets 107 (Fig. 7) which are mounted upon the upper ends by spaced parallel bars 100 and each bar 100 is mounted for vertical sliding movement within a pair of guides 101 secured to the rear bottom cross member 9 and rear top cross member 10 respectively. Parallel motion is imparted to the bars 100, during the time top stabilizer bar 99 is raised and lowered through engagement with rollers 99—96 on card trays 2, by a pair of pivoted arms 102 and links 103. As shown in Figs. 5 and 6, arms 102 are pivoted upon studs 104, the studs being mounted in plates 105 and said plates being secured to the rear outer chain track 42 by bolts 106.

Meshing gear segments, formed on the inner ends of arms 102, cause the arms to rotate in opposite directions about their pivot studs 104, and the ends of links 103 are pivotally connected to the outer ends of arms 102 and to bars 100 respectively as best shown in Fig. 7. Top stabilizer bar 99 is normally held in lowered position by a pair of springs 108, the springs being anchored between lower guides 101 and pivoted arms 102 respectively. When it is desired to remove the card trays 2 or replace them upon studs 46, top stabilizer bar 99 may be moved to and held in elevated position by engaging latch 109 with a notch 110 formed in the right hand bar 100 as illustrated by dotted lines in Fig. 7.

*Case cover*

As mentioned earlier in the specification when cover 3 is removed from casing 1, it may be utilized to serve as a desk or table for an operator using the endless conveyor file A. This cover will now be described in detail with attention being directed particularly to Figs. 1, 2 and 13 to 17 respectively. As shown in these views, cover 3 comprises a sheet metal top 111, side walls 112 and front and rear end walls 113 and 114 respectively. The top and side walls are reinforced by transverse channel members 115, preferably spot welded thereto, and front and rear end walls 113 and 114 slidably support a pair of U-shaped handles 116 for convenient handling of the cover. When serving as a desk or table, one end of cover 3 is supported by a pair of spaced legs 117 which are joined near their lower ends by cross bar 118. The upper ends of legs 117 are pivoted upon studs 119 carried by brackets 120. Each leg is provided with a pivoted latch 121, adjacent the pivot 119, for cooperation with a pair of notches 122 formed in brackets 120 to hold the legs in open position as shown in Fig. 2, or in closed position within cover 3, as shown in Fig. 14. Each latch 121 is normally spring-urged into holding engagement with the upper notch 122 when holding the legs 117 in closed position and spring-urged into holding engagement with the lower notch 122 when holding the legs in open position. When it is desired to move the legs from closed to open position or vice versa, latches 121 are simultaneously withdrawn from notches 122 by pulling outwardly on chain 123, the ends of which are pivotally connected to the latches as shown in Figs. 13, 14 and 17 respectively.

When cover 3 is used as a desk or table, end 114 thereof is supported by the foldable legs 117 above described, and end 113 is supported by the upper edge section 22 of either side panel 14 or 15 by hooks 124 formed on the outer ends of retractable strips 125. Strips 125 are mounted for horizontal sliding movement within short channel sections 126 and the sections are suitably welded to the underside of sheet metal top 111 at the places indicated in Fig. 13. It is desirable to have the hooks 124 of strips 125 retracted and concealed within cover 3, when legs 117 are not in use and folded to the position shown in Fig. 14, but extended to the position shown in Fig. 15 when the legs are unfolded to support the cover as shown in Fig. 2. This is accomplished by the provision of a pair of long links 127. One end of each link 127 is pivotally connected by stud 128 to the upper end of its associated leg 117 and the other end is secured to the inner end of its associated strip 125 by screws 129.

A pair of compression springs 130 (Fig. 15) are provided to facilitate moving legs 117 from closed position to open position when chain 123 is pulled outwardly to withdraw latches 121 from the upper notches 122 in brackets 120. The left end of such springs (as viewed in Figs. 14 and 15) seat against vertical wall sections 131, formed in plates 132 spot welded to strips 125, and the right end of said springs seat against vertical wall sections 133 bent upwardly from channel members 126.

Occasions may arise wherein it becomes desirable to drive main shaft 53 manually instead of by power from motor 56. For this purpose a detachable hand crank designated 134 (see Figs. 2, 3, 4 and 5) is provided. Hand crank 134 preferably comprises an arm 135 having hand knob 136 rotatably mounted on one end and a pair of tubular studs 137 rigidly mounted on its other end and spaced to receive slotted studs 79 carried by the large pulley 72. Arm 135 is further provided with a pivoted disc 138 having diametrically opposed offset ears 139 (Fig. 3), the ears being arranged to enter slots in the tubular studs 137 and aligned annular grooves in studs 79 upon counter-clockwise rotation of disc 138 to detachably lock the hand crank to pulley 72. Front end panel 12, of casing 1, has a circular hole 140 (Fig. 8) to receive hand crank 134 and this hole is closed by a cap 141 (Figs. 2, 11 and 12) when the hand crank is removed from the studs 79.

Provision is made for automatically opening the circuit to motor 56 during manual rotation of main drive shaft 53 through the use of hand crank 34 above described. This is effected, upon removal of cap 141 from front panel 12, through microswitch 147 inserted in supply line 148 (see Fig. 11). Microswitch 147 is conveniently mounted upon top flange 77 of bottom cross member 6, and its operating arm 182 is actuated by an ear 183 bent rearwardly from the lower end of strip 184, the latter being mounted for vertical sliding movement upon headed studs 185 which project rearwardly from panel 12. The upper end of strip 184 is similarly provided with a rearwardly disposed ear 186 which cooperates with any one of spring fingers 187 formed on cap 141. The construction is such that when cap 141 is removed from circular hole 140 in panel 12, to attach hand crank 134 to slotted studs 79, switch arm 182 will snap upwardly to open position shown by full lines in Fig. 11 and in so doing will elevate strip 184 to carry ear 186 above the lower edge of hole 140. It follows therefore that when hand crank 134 is removed from the slotted studs 79 and cap 141 is replaced, any spring finger 187 adjacent the ear 186 will force strip 184 downwardly (Fig. 12) which in turn depresses switch arm 182 to close the motor circuit through said switch.

*Wiring diagram*

The wiring diagram in Fig. 22 illustrates one type of circuit by which motor 56 is controlled from buttons F and G to move the card trays in clockwise or counter-clockwise direction within the filing casing. For example, when it is desired to have the trays 2 move clockwise within casing 1, button F is depressed thus closing switch 145, and assuming that line switch 146 and front panel switch 147 in supply line 148 are closed, current will flow from supply line 148, through switches 147, 146 and 145 respectively, to one side of coil 149 of relay H, and then through wire 161 to the other supply line 150 thus energizing coil 149. When coil 149 is thus energized, movable contact arms 150, 151 and 152 are moved to engage contacts 153, 154 and 155 respectively, and the movement of contact arm 152 also disengages contact 156. As soon as contact arm 150 is engaged with contact 153, a stick circuit for coil 149 is closed as follows: Current flows from supply line 148, through wire 162, microswitch 157, wire 158, movable contact arm 150, through contact 153, wire 163 to one side of coil 149, through said coil and wire 161 to the other supply line 150. This stick circuit maintains coil 159 continuously energized so that button F may be released by the operator and until microswitch 157 is opened by one of the cams 159 on main drive shaft 53. By means of the cams 159, the conveyor mechanism will be driven through one complete cycle of operation and whereupon one of the cams 159 will operate microswitch 157 and open the circuit to coil 149 of relay H to stop operation of the motor 56.

When relay coil 149 is initially energized, it closes a motor circuit to start motor 56 as follows: Current from supply line 148 flows through wire 167 to stationary contact 154, through movable contact arm 151 and wire 168 to terminal T–2 of motor 56, through the motor starting winding I and centrifugal motor switch J to motor terminal T–3 and then to the other supply line 150. Current is also supplied from line 148 and wire 167 to contact 155, through movable contact arm 152 and wire 164 connected with motor terminal T–1, through the running winding K of motor 56 to motor terminal T–4, through wire 165 to movable contact arm 172 of relay L, contact 176 and wire 166 to the other supply line 150. It will now be understood that the motor circuit just described will be opened when coil 149 of relay H is de-energized, when switch 157 is opened by one of the cams 159 carried by the main drive shaft 53.

When it is desired to reverse the movement of the trays from that above described so that they move in a counter-clockwise direction within casing 1, the operator will depress button G to close switch 177 thereby closing a circuit from supply line 148 to energize coil 178 of relay L connected with the other supply line 150. When coil 178 is thus energized, movable contact arms 170, 171 and 172 are moved to engage stationary contacts 173, 174 and 175 respectively, and arm 172 will be disengaged from contact 176. As soon as contact arm 170 is engaged with contact 173, a stick circuit for coil 178 is closed as follows: Current flows from supply line 148, through wire 162, microswitch 157 and wire 158, to movable contact arm 170, through contact 173, wire 169, to coil 178, and through said coil to the other supply line 150. This stick circuit maintains coil 178 continuously energized so that button G may be released by the operator and until microswitch 157 is opened by one of the cams 159 on main drive shaft 53. The conveyor mechanism will be driven through one complete cycle of operation at which time one of the cams 159 will operate microswitch 157 to open the circuit to coil 178 to stop operation of motor 56.

When coil 178 of relay L is initially energized, it causes a circuit to start motor 56 for counterclockwise rotation as follows: Current flows through supply line 148, to stationary contact 174, then through movable contact 171, wire 180, and wire 168 to motor terminal T–2 of motor 56, through the motor starting winding I and centrifugal motor switch J to terminal T–3 and then to supply line 150. Current is also supplied from line 148, through contact 175, movable contact arm 172, and wire 165, connected with terminal T–4, through the running winding K to motor T–1, through wire 164, to movable contact arm 152 of relay H, contact 156, wire 181, and wire 161, to the other supply line 150. It will now be clear that upon depression of button F for clockwise rotation of motor 56 the current is from T–1 to T–4, and that upon depression of button G for counter-clockwise rotation of motor 56, the current flow will be from T–4 to T–1. It will also be clear that current flow to the starting winding I is from motor terminal T-2, to motor terminal T-3, regardless of the direction of current flow through the running winding K.

Motor 56 may be of the conventional A. C. split-phase induction type, having a starting and running winding, the starting winding being interrupted by the conventional centrifugal switch J in well known manner. It will be understood however, that other types of motors can also be employed in connection with the above described circuit for controlling clockwise and counter-clockwise movement of the card trays within casing 1.

*Operation*

From the foregoing detailed description of the construction and arrangement of parts, which constitute the endless conveyor file A, it will now be clearly understood that all of the card trays are simultaneously moved or shifted in an endless vertical path within the casing and in such a manner that the trays may be continuously moved into and out of reference position adjacent the top of the casing or intermittently moved in successive steps into and out of reference position adjacent the top of the casing. It has also been pointed out that such movement of the trays may be accomplished by power, through motor 56, or manually, by use of hand crank 135.

The first step in the use of file A is to remove cover 3 from casing 1, and if the cover is to be utilized as a desk or table for an operator as illustrated in Fig. 2, its supporting legs 117 are unfolded thereby extending the hooks 124 for convenient attachment to the top edge section 22 of either side panel 14 or 15 in a manner previously described.

Assuming that file A is to be power operated, and that supply lines 148 and 150 have been connected to a suitable source of electric current supply, the sequence of a typical operation is as follows: When the right hand switch 145 is closed, through manual depression of push button F, current from supply line 148 passes through coil 149 and closed contacts 152—156 of relay H to the running winding K of motor 56 and then by way of normally closed contacts 172—176 of relay L to supply line 150. At the same time, current also passes from supply line 148, through closed contacts 151—154 of relay H, and through the starting winding I, and centrifugal switch J, to supply line 150. Within a small fraction of a second, the starting winding is interrupted by the centrifugal switch, whereupon the motor runs normally in a clockwise direction until relay H is de-energized.

In order to provide for automatic positioning of each card tray 2 adjacent the top of casing 1, the electric current in the coils 149—178 is maintained through contacts 150—153 and 170—173 of relays H and L respectively, by the cam operated switch 157. Cams 159 are so positioned on main shaft 53 that switch 157 is opened once each time the trays pass a pre-arranged point. Thus, it will be seen that as soon as motor 56 starts, top cam 159 will be rotated far enough to allow switch 157 to close. This provides a connection for coil 149 to supply line 150 which by-passes the starting switch 145 through closed relay contacts 150—153. Once switch 157 has closed, the starting switch 145 may be opened at any time through release of button F and the tray carrier mechanism and main drive shaft 53 will continue to rotate clockwise until the second cam 159 reopens switch 157. When this occurs, coil 149 of relay H is de-energized from supply line 148 and the relay opens contacts 150—153, 152—155, and 151—154 de-energizing the motor 56 and stopping a pairs of trays at reference position adjacent the top of casing 1.

In the normal operation of this type of device, a small amount of overrun is usually encountered. In the present invention this is compensated for by causing the cams 159 to open switch 157 enough in advance of the desired position of the trays to anticipate the overrun. This is accomplished by making the cam lobes wide enough to stop at the mid-point in each direction, allowing for overrun of the main shaft and motor after switch 157 opens.

Reversal of the tray direction or counter-clockwise rotation is accomplished by manually depressing the right control button G to close switch 177. This operates relay L and changes the polarity of the running winding K. Other operation is the same throughout as for the original direction of tray rotation.

It will now be clearly apparent that upon depression of control button F, and subsequent release, a single operating cycle will be initiated to move the top tray of the left hand vertical row of trays (as viewed in Figs. 2 and 6) to the top position of the right hand vertical row of trays. It will be further noted that in normal position four trays are in the left vertical row and a like number in the right vertical row, that crank arms 52, fast on main shaft 53, are in perpendicular position with their top rollers 51 in horizontal alignment with opposed tray arms 45 of the second tray in each vertical row, and that their bottom rollers 51 are in horizontal alignment with opposed arms 45 of the third tray in each vertical row. When main shaft 53 is in the position just described, the top cam 159 (Fig. 10) will be holding microswitch 157 open through the pivoted arm 188. It follows, therefore, that for each depression and subsequent release of buttons F or G, main shaft 53 will be rotated 180° and at the end of each 180° rotation microswitch 157 is opened, through arm 188 under the control of cams 159 as above described. Thus for each 180° rotation of main shaft 53, all trays will be shifted one position in clockwise or counter-clockwise direction depending upon whether button G or button F is depressed. At the beginning of each 180°, clockwise rotation of the main shaft (as viewed in Fig. 10) top rollers 51 on cranks 52 enter and engage lips 50 of the adjacent hangers 45 in the right row of trays and the bottom rollers 51 enter and engage lips 50 of the adjacent hangers in the left row of trays, and as the cranks 52 rotate 180°, the hanger arms and trays will be driven one position clockwise within casing 1. Likewise, upon depression of the left hand control button G, main shaft 53 will be rotated 180° in a reverse or counter-clockwise direction to that above described for button F and consequently the trays will be moved counter-clockwise one position within the casing 1.

The trays 2 may be continuously moved any number of steps within casing 1 by continued depression of the button F or G, and as long as such buttons are held depressed, opening of switch 157 through the cams 159 is ineffective to break the motor circuit.

Figure 19:
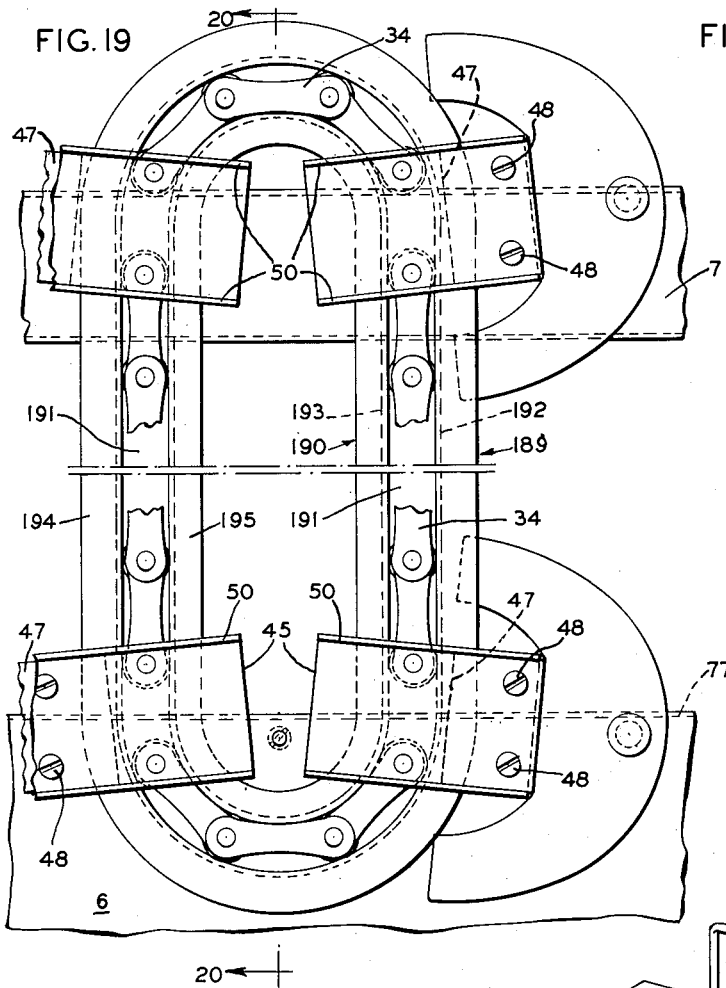
Fig. 19 is a fragmentary elevational view illustrating a modified construction for the inner and outer chain tracks or guides.
Figure 20:
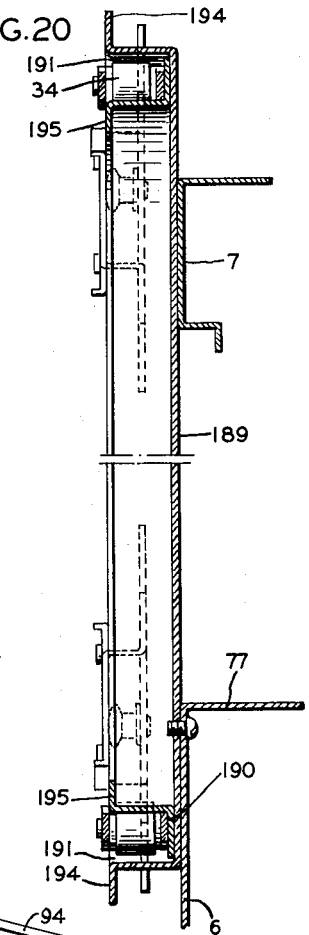
Fig. 20 is a vertical cross section of the modified chain tracks taken on a plane corresponding to the line 20—20 of Fig. 19.

A modification of the tracks for the endless conveyor chains 34 is shown in Figs. 19 and 20 and these tracks eliminate the need for sprockets 35 described in connection with the outer chain tracks 42 and inner chain tracks 43.

As shown in Figs. 19 and 20 the modified chain tracks comprise outer track members 189 and inner track members 190, the inner track members being conveniently secured to the outer track members by spot-welding or other suitable fastening means to form endless grooves or raceways 191 for the conveyor chains 34. As shown in Fig. 19, the raceways 191 are formed by parallel wall sections 192 and 193 of outer and inner track members 189 and 190 respectively. Each outer track member 189 has an outwardly disposed flange 194 and each inner track member 190 has an inwardly disposed flange 195 along which the tray arms 45 slide. The tray arms 45 are further guided in their movement within casing 1 by plates 47 carried by the tray arms 45 and cooperating with the outwardly disposed flange 194. The modified track members 189 and 190 may also be joined, in spaced relation, by tie rods 37 to form a portion of a center frame E in a manner identical to that described in connection with the chain tracks used in association with sprockets 35. Operation of the tray arms and conveyor chains is the same as that previously described.

While we have shown and described particular embodiments of our invention, it will be apparent to those skilled in the art, that numerous modifications and variations may be made in the form and construction thereof, without departing from the more fundamental principles of the invention. We therefore desire, by the following claims, to include within the scope of our invention all such similar and modified forms of the apparatus disclosed, by which substantially the results of the invention may be obtained by substantially the same or equivalent means.

The invention claimed is:

1. An endless conveyor file for storing and displaying vertically filed cards comprising: a casing which includes a main supporting frame; a pair of spaced parallel chain tracks secured to the respective ends of said frame; a pair of endless conveyor chains mounted for movement in a vertical path within said chain tracks respectively; a plurality of outwardly disposed arms carried by each conveyor chain at equally spaced intervals; card trays detachably connected to and movable with said arms; a rotatably mounted main drive shaft; power means for rotating said shaft including an electric motor and a series of reduction gears; a pair of crank arms fast on said main drive shaft; rollers rotatably mounted on the ends of each crank arm for cooperation with said arms to move said chains within said tracks, and in turn, selected pairs of such trays to the top of said casing; and stabilizer means to effect horizontal positioning of the trays throughout their travel in an endless path.

2. An endless conveyor file for storing and displaying vertically filed cards, comprising: a casing having a main frame the open ends and sides of which are closed by removable panel members; a center frame rigidly secured to said main frame and including spaced parallel chain tracks having vertically disposed raceways formed therein; an endless conveyor chain slidably mounted in the raceway of each chain track; a plurality of spaced offset arms connected for movement with said conveyor chains; a plurality of card trays each pivotally mounted between a pair of said arms for movement in an endless vertical path within said casing; a horizontally disposed drive shaft journalled for rotation within bearings mounted in said center frame; cranks on said drive shaft; rollers on said cranks for successively engaging pairs of said arms; and means for rotating said drive shaft and in turn said cranks and rollers, to move said arms whereby selected pairs of said trays are moved to reference position adjacent the top of said casing.

3. The combination, in an endless conveyor file of the character described: of a casing comprising a main supporting frame and a center frame rigidly secured to said main frame; spaced vertical chain tracks on said center frame; a pair of spaced endless conveyor chains movably supported within said tracks; a plurality of equally spaced offset tray arms connected to each chain for movement therewith; a plurality of card trays each of which is detachably supported by a pair of said arms; a main drive shaft journalled in said center frame; power means for rotating said drive shaft; and means on said shaft, cooperable with said arms, to move said trays in an endless vertical path within said casing during rotation of said shaft, said last named means including a pair of crank arms and driving rollers on said crank arms.

4. An endless conveyor file of the class described for storing and displaying vertically filed record cards, comprising: a casing having an open top and a main supporting frame; a center frame mounted within said main frame; a plurality of horizontally disposed removable card trays; conveyor means for said trays comprising a pair of spaced endless chains, each chain having a plurality of offset arms attached thereto at equally spaced intervals; means carried by said arms upon which said card trays are horizontally suspended in vertical parallel rows for simultaneous movement in an endless vertical path; a main drive shaft horizontally disposed in said center frame; means on said drive shaft cooperating with said arms for moving selected pairs of said trays to reference position adjacent the open top of said casing including at least one crank arm having driving rollers thereon; power means to rotate said main drive shaft including a reversible electric motor; and driven means connecting said power means with said main drive shaft.

5. An endless conveyor file according to claim 4 in which means are provided to restrain pairs of said trays in horizontal alignment each time rotation of said main drive shaft is stopped.

6. An endless conveyor file according to claim 4 wherein the main supporting frame comprises a front frame member and a rear frame member, the frame members being joined to one another, in spaced parallel relation, by horizontally disposed top and bottom side members; and a shallow drawer mounted for horizontal movement within runways at the bottom of said casing.

7. An endless conveyor file of the class described comprising, in combination: a main frame having an open top, bottom, sides and ends; panel members detachably secured to said frame for closing the open sides and ends thereof; a center frame having a pair of chain tracks mounted at opposite ends thereof and securely connected to said main frame through said tracks; a pair of endless conveyor chains rotatably mounted within said tracks respectively, for movement in a closed vertical path; a plurality of arms attached to said chains at equally spaced intervals; means on said arms cooperable for slidable engagement with said chain tracks; a plurality of card trays detachably suspended from said arms; a main drive shaft rotatably mounted in said center frame; driving cranks mounted at opposite ends of said shaft for rotation therewith; rollers on the ends of said cranks cooperating with said arms to drive said chains during rotation of said shaft; and means for rotating said shaft to move successive pairs of such trays to reference position adjacent the top of said main frame.

8. An endless conveyor file according to claim 7 wherein stabilizing means are mounted at one end of said main frame to maintain the trays in horizontal position throughout their travel within the file, said stabilizing means comprising: a looped stabilizer bar fixed to said frame and a movable stabilizer bar mounted for vertical movement within said file; and rollers carried by one end of each tray for rolling engagement with said stabilizers substantially as described and for the purposes set forth.

9. An endless conveyor file of the class described comprising, in combination: a casing; a pair of spaced conveyor chains mounted to travel in an endless vertical path adjacent the ends of said casing; tray arms for each conveyor chain mounted at spaced intervals along the chain; detachable card trays carried by aligned pairs of such arms, such trays normally disposed in a pair of vertical rows within said casing; a main drive shaft extending longitudinally within said casing; cranks fixed for rotation with said main drive shaft; rollers on said cranks arranged to successively engage said arms to drive said chains upon rotation of said main drive shaft; reduction gearing; a reversible motor connected to drive said shaft through said gearing; and circuity for said motor including a pair of manually depressible push buttons, and a pair of relays for controlling rotation of said main drive shaft in clockwise and counter-clockwise directions for selectively moving said trays to and from reference position adjacent the top of said casing.

10. An endless conveyor file according to claim 9 in which the circuity for the motor selectively controls intermittent and continuous movement of the trays within the casing.

11. An endless conveyor file for storing and displaying vertically filed cards, comprising the combination of: a rectangular casing including a main supporting frame; a center frame comprising a pair of inner and outer chain track members forming vertical raceways; the rods connecting said track members; spaced stabilizer frame members supported by said tie rods; a main drive shaft rotatably journalled in bearings mounted upon said stabilizer frame members; cranks mounted on opposite ends of said drive shaft; rollers mounted upon the ends of said cranks; an endless conveyor chain mounted for rotation in each raceway of said chain track members; hanger arms secured at spaced intervals to each chain; spaced parallel lips on each hanger arm; a plurality of card trays suspended from said arms in two vertical rows; and power means arranged to rotate said motor drive shaft whereby said cranks are caused to drive said arms by engagement of said rolls with said lips upon rotation of said main drive shaft through said power means, to move selected trays to reference position at the top of said vertical rows within said casing.

12. An endless conveyor file according to claim 11 in which one end of each card tray is provided with a plurality of rollers for rolling engagement with said stabilizer frame members to maintain horizontal positioning of the trays throughout their travel within said casing.

13. An endless conveyor file comprising, in combination: a casing including a main supporting frame; a pair of chain tracks rigidly supported by said main frame in spaced parallel relation to each other; a pair of conveyor chains mounted for vertical movement within said tracks; offset tray supporting arms mounted on said chains at equally spaced intervals; a plurality of card trays detachably mounted on said arms; a main drive shaft; means on said shaft for driving said arms during rotation of said shaft including at least one crank arm having driving rollers thereon; and means for imparting rotary motion to said drive shaft for selectively presenting pairs of said trays in horizontal reference position adjacent an opening in the top of said casing.

References Cited in the file of this patent

UNITED STATES PATENTS

| | | |
|---|---|---|
| 1,691,186 | Greth | Nov. 13, 1928 |
| 1,918,195 | Robertson | July 11, 1933 |
| 1,938,985 | Starr | Dec. 12, 1933 |
| 2,030,741 | Bodine | Feb. 11, 1936 |
| 2,198,480 | Lindemann | Apr. 23, 1940 |
| 2,221,510 | Dunham et al. | Nov. 12, 1940 |
| 2,285,110 | Clerc | June 2, 1942 |
| 2,358,507 | Haberstump | Sept. 19, 1944 |
| 2,673,779 | Stewart et al. | Mar. 30, 1954 |